Patented June 22, 1926.

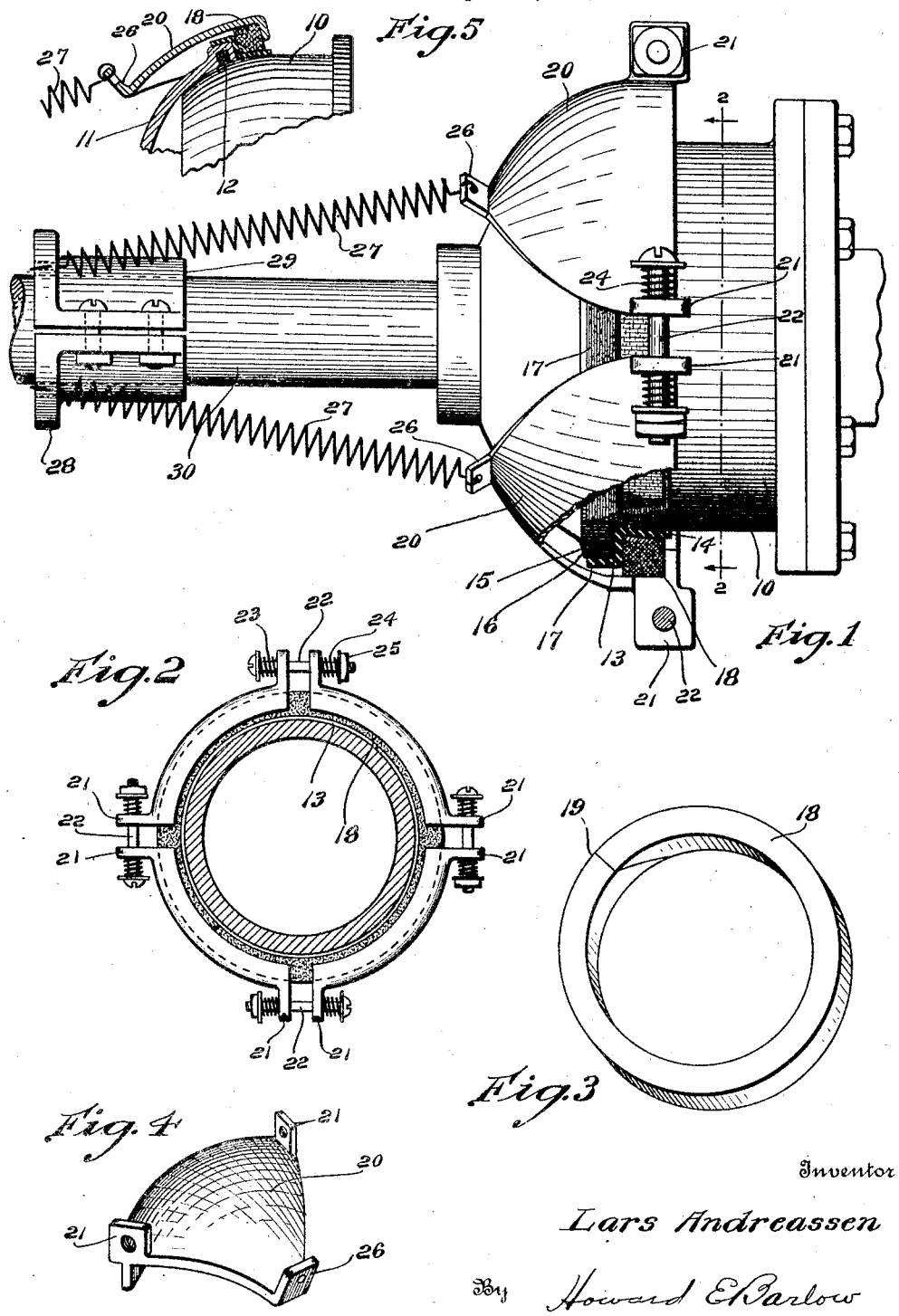

1,589,829

UNITED STATES PATENT OFFICE.

LARS ANDREASSEN, OF PROVIDENCE, RHODE ISLAND.

PACKING FOR UNIVERSAL JOINTS.

Application filed September 23, 1922. Serial No. 590,203.

This invention relates to improvements in packings for universal joints for shaft drive, and has for its object to provide in such a joint having a pair of casing members, a packing ring encircling the bearing surface of the ball-member of the joint at the end of the socket member and the provision of means for applying both a circular and a longitudinal pressure to the packing ring to prevent the grease in the casing from working out through the joint.

A further object of the invention is to provide a plurality of segmental members through which pressure is applied to the packing.

With these and other objects in view, the invention consists of certain novel features of construction, as will be more fully described, and particularly pointed out in the appended claims.

In the accompanying drawings:

Figure 1 is a side elevation of a universal joint with my improved means for packing the casing joint against the escape of grease, a portion of the pressure-supplying means and the packing being shown in section.

Figure 2 is an end view on line 2—2 of Figure 1, showing the means for applying a circular pressure to the packing through the segmental members.

Figure 3 is a perspective view showing one of the fabric packing rings in detail.

Figure 4 is a perspective view showing one of the pressure-applying segments in detail.

Figure 5 is a fragmentary view of the joint casing partly in section showing a portion of one of the segmental members as applying pressure to the packing rings.

It is found in practice in the practical operation of universal joints for shafts of motor vehicles, that where the rounded or ball end of one of the casing members fits into the corresponding socket portion of the opposite casing members, the grease with which the casing is supplied has a tendency to work out and be thrown about over the surrounding parts and soon the working parts within the casing become dry and worn, although in many instances a packing is provided in one of the casing members for preventing this, and to effectually pack this joint against the escape of grease, I have provided a packing ring, preferably of pliable material such as felt or fabric which surrounds the bearing surface of the ball member at the end of the socket member and have provided means whereby both a circular and a longitudinal pressure may be applied to this packing ring to effectually close this joint and so prevent the escape of grease therefrom; and the following is a detailed description of one means by which this result may be accomplished:—

With reference to the drawings, 10 designates the ball end member of the casing which is a portion of a sphere, or rounded at its end, to fit into a correspondingly-shaped socket member 11 and within which casing the universal joint is housed, the two casing members serving as a receptacle to retain sufficient grease for properly lubricating the working parts of the joint and at the same time exclude foreign matter therefrom.

In some instances the ordinary joint is provided with a packing ring 12 whch is located in an annular recess adjacent the edge of the socket member, but this is found to be insufficient for retaining the grease against the pumping or forcing action of the joint when in operation. Therefore, it is found in practice necessary in order to effectually stop the leakage of grease through this joint to provide additional means for this purpose and to successfully accomplish this I have provided an annular packing ring of felt 13, which is substantially Z-shape in cross section, having one portion 14 lying against the working face of the ball member and one portion 15 lying against the end face of the flange 16 of the socket member, and I preferably have a portion 17 lying against the outer face of the flange 16, the ends of this felt ring preferably overlap but may abut if desired.

In order to bind this felt ring-shaped washer tightly against both the bearing surface of the ball member and the flanged face of the socket member and crowd the same tightly against the joint portion between the two members, I have provided a packing ring 18 which may be formed of any suitable flexible material, preferably felt, cotton, or other fabric. I then position the joint portion 19 of this ring so as not to register with that of the inner felt ring, and in order to bind this outer ring against the inner ring, I have provided a plurality of segmental sections 20, preferably of metal, each being provided with a pair of ears 21. Through the adjacent ears of the adjacent segments, I have passed a binding bolt 22, each having a spring 23 under its head and another spring 24 under its nut portion 25, whereby by setting up the nut of each of these segments a circular tension is applied through them to the inner and outer packing rings 13 and 18, to flexibly apply the necessary pressure to bind the inner packing ring tightly against the surface of the ball member of the casing.

It is found desirable in addition to applying a circular pressure to the packing, to also apply an endways pull or pressure on the segmental members so as to draw them tightly against the flanged end of the socket member, which is accomplished by providing an upturned end portion on each segment forming an ear 26 pierced to receive one end of the tension spring 27, the opposite ends of these springs being attached to the flange 28 of the collar 29 which may be adjusted lengthwise of the shaft 30 to control the extent of longitudinal pull of the segments against the packing ring 18.

By this construction, it will be seen that the packing ring is pressed tightly both circularly and longitudinally to force the inner felt ring so as to positively close the joint opening between the ball member and the cup member of the joint housing and so positively prevent the grease from being forced therefrom.

My improved packing for preventing leakage of grease from the joint housing is very simple and practical in construction and effective in its operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A packing for a universal joint in combination with a pair of casing members in which the ball end of one works in the socket of the other, of a packing ring at the edge of the socket member and about the bearing surface of the ball member, a plurality of segmental presser members, and means for applying a pressure on said packing and taking up its wear.

2. A packing for a universal joint in combination with a pair of casing members in which the ball end of one works in the socket of the other, of a packing ring at the edge of the socket member and about the bearing surface of the ball member, a plurality of segmental members, adjustable means for applying a radial pressure on said packing, and spring means also acting on said segmental member for applying a longitudinal pressure on said packing to hold it against the edge of the socket member.

3. A packing for a universal joint in combination with a pair of casing members in which the ball end of one works in the socket of the other, of a packing ring at the edge of the socket member and about the bearing surface of the ball member, a plurality of segmental members, and adjustable means acting upon said members for applying a yieldable circular pressure to the packing.

4. A packing for a universal joint in combination with a pair of casing members in which the ball end of one works in the socket of the other, of a packing ring at the edge of the socket member and about the bearing surface of the ball member, a plurality of segmental members, and adjustable spring means for applying both a circular and a longitudinal pressure on said packing.

In testimony whereof I affix my signature.

LARS ANDREASSEN.